BALANCED LIMITER-DETECTOR CIRCUIT FOR RADIO RECEIVER

Filed March 13, 1967

INVENTORS
Jerry M. Mason &
Donald E. Tomaszewski
BY Robert E. Fowler
ATTORNEY

3,493,871
BALANCED LIMITER-DETECTOR CIRCUIT FOR RADIO RECEIVER

Jerry M. Mason and Donald E. Tomaszewski, Kokomo, Ind., assignors to General Motors Corporation, Detroit, Mich., a corporation of Delaware Filed Mar. 13, 1967, Ser. No. 622,763
Int. Cl. H04b *1/10*
U.S. Cl. 325—482 9 Claims

ABSTRACT OF THE DISCLOSURE

A balanced limiter-detector section for radio receivers to be used between the output of the intermediate frequency (IF) amplifier and the input to the audio frequency (AF) amplifier to limit or reduce noise signals and provide a high signal to noise ratio. Two conductive paths are provided containing a diode in each for detecting different halves of the modulated signal and an attenuator in one for attenuating the respective half of the modulated signal detected by said one path, wherein, in combining the conductive path outputs only the noise signals are cancelled.

DESCRIPTION OF THE PREFERRED FORM OF THE INVENTION

One of the problems of radio reception is that of maintaining a satisfactory signal to noise ratio. This is more acute in mobile radio receivers than others. There have been many different proposals of ways to improve the listenability of the incoming signals. While signal to noise ratio enhancing devices (Boatwright, 3,217,257 and Englebrecht, 3,196,354) and amplitude modulated limiter-detetctor circuits (Mitchell, 2,912,573) are shown in the art, these are only generally related to the present disclosure.

The modulated signal at the output of the last intermediate frequency (IF) amplifier contains an envelope of sound modulation, noise modulation, and the IF carrier frequency. It has a positive and a negative going half and the two are fed in the present disclosure through two different channels and so filtered and treated by the circuitry disclosed as to appear at the ouput with reduced or nominal noise. The output of this section is fed into the audio frequency (AF) amplifier of a conventional radio receiver.

Figures 1, 2, 3:
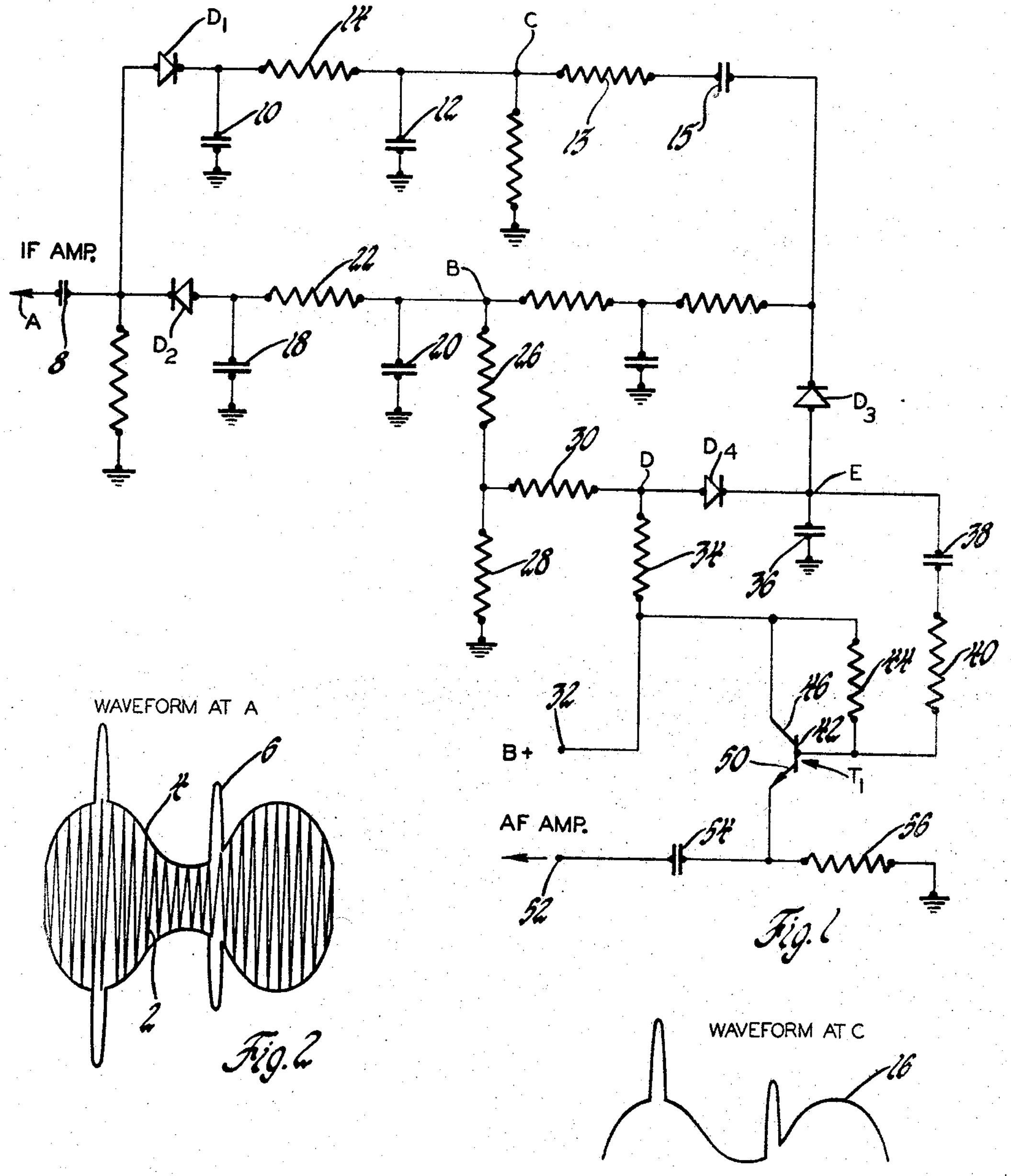
FIGURE 1 is a circuit diagram of a balanced limiter-detector circuit for a radio receiver disclosing our invention.
FIG. 2 is a diagrammatic showing of the total signal wave form at the ouput of the IF amplifier which is applied to point A of FIG. 1.
FIG. 3 is a diagrammatic showing of the wave form of the positive half of the signal appearing at point C in FIG. 1 after it has been detected and the IF carrier has been filtered out; and, FIG. 4 is a similar diagrammatic showing of the wave form of the negative half of the signal appearing at point B of FIG. 1.

It is clear that the incoming total signal appearing at point A in FIG. 1 and applied to the balanced limiter-detector section contains in the main three portions; (1) the high frequency carrier 2, (2) the AM modulated envelope 4 which is the wanted signal, and, (3) the sharp pulsed peaks or noise 6 which is not wanted. These are all evident on an examination of the wave form A shown in FIG. 2. This wave is applied through coupling condenser 8 to two separate detector-filter paths. The first is through a diode $D_1$ to which the positive going half of the wave is applied and which detect the same. This positive going half after detection by diode $D_1$ has the IF suppressed by the filter following the same which consists of condensers 10 and 12 and the resistance 14. The detected positive going half, therefore, with the IF carrier removed as shown at 16, FIG. 3, appears at point C.

Figure 4:
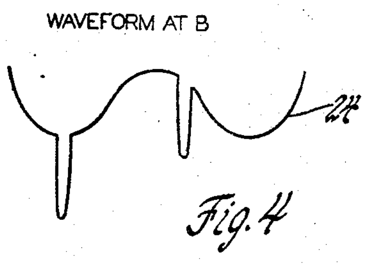

In the same manner the negative going half of the incoming wave is detected by diode $D_2$ and the intermediate frequency carrier suppressed or filtered by the following filter consisting of condensers 18 and 20 and resistor 22. The negative going detected half of the wave form 24 as shown in FIG. 4 appears at point B in FIG. 1.

The signal wave form at point C is next applied through resistor 13 and blocking capacitor 15 to a limiter diode $D_3$ which is in series therewith for purposes of clipping. The signal wave form 24 of FIG. 4 appearing at point B is attenuated by the voltage divider consisting of resistors 26 and 28 connected in series between point B and ground and then applied through series resistor 30 to a similar limiter diode $D_4$. B+ terminal 32 is connected serially through resistor 34 to point D. Resistance 30 is connected between D and a point between resistance 26 and resistance 28. This fixed bias on the diodes $D_3$ and $D_4$ together with the forward bias developed across resistor 26 by the signal at B through diode $D_2$ sets the level at which the two diodes $D_3$ and $D_4$ will conduct or clip. If properly adjusted, and if resistors 26 and 28 are properly chosen, this level permits the sinusoidal currents of the signal wave form at C and the attenuated sinusoidal currents of the wave form at D to pass through the diodes without being seriously limited or clipped. However, the peak noise currents are limited in amplitude by the diodes and further, since the diodes are both biased to the same level, (being connected in series) the amplitudes of the clipped noise pulses are equal.

The two signals appearing at E combine to provide the output voltage and are developed across condenser 36. This resists any sudden changes in voltage further suppressing sharp pulse wave forms. Since the noise impulses arriving at point E are of equal amplitude and 180° out of phase they will cancel. However, since the desired sinusoidal signal wave forms are 180° out of phase but of unequal amplitudes, the resultant is a similar wave form of reduced amplitude. Thus, the noise impulses cancel and the desired audio wave form is simply reduced in amplitude. In practice a certain amount of clipping of the audio wave form is also encountered, thus resulting in a certain amount of distortion of the desired signal. The audio signal is applied to the emitter-follower stage formed by transistor $T_1$. Point E is connected through condenser 38 and resistor 40 to the base 42 of transistor $T_1$. A biasing resistance 44 is connected from the base to collector electrode 46 which is directly connected to B+. The output from this stage is taken from the emitter 50 to the AF amplifier through condenser 54 to terminal 52. Biasing resistor 56 is connected between emitter 50 and ground. The emitter-follower amplifier stage prevents loading of the output load capacitor 36. Diodes $D_3$ and $D_4$ should have sharp knee characteristics for proper operation.

This coupling section shown in FIG. 1, therefore, suppresses the noise signals without affecting the wanted audio signals, thus providing a satisfactory audio output.

What is claimed is:

1. In a communication receiver for modulated high frequency waves which include wanted intelligence modulation, noise pulses and carrier frequency waves, said receiver having high frequency amplifying means and audio frequency amplifying means; a coupling stage connecting the high frequency amplifying means and the audio frequency amplifying means and including a first conductive path comprising means for detecting and filtering one-half of the modulated wave, a second conductive path comprising means for detecting and filtering the opposite half of the modulated wave, said second conductive path including means for attenuating the signal passed therethrough, clipping and biasing means in each conductive path to limit the amplitude of signals passed therethrough and common conductive means for connecting together the remote ends of the two conductive paths so that the signals will be in opposite phase, and means for connecting the resultant combined signal to the audio amplifying means.

2. A coupling stage for a communication receiver as defined in claim 1 in which the common conductive means for connecting together the remote ends of the two conductive paths includes a condenser across which the combined phase opposed signals are developed to further suppress sharp pulses.

3. A coupling stage for a communication receiver as defined in claim 2 in which said common conductive means for connecting together the remote ends of the two conductive paths further includes a transistorized amplifier stage connected to said condenser and receiving the composite signal developed across the same for amplification and application to the audio amplifier means.

4. In a communication receiver for modulated high frequency waves which include wanted intelligence modulation, noise pulses and carrier frequency waves, said receiver having high frequency amplifying means and audio frequency amplifying means; a coupling stage connecting the high frequency amplifying means and the audio frequency amplifying means and including a first conductive path, a diode connected in said first conductive path and so poled as to detect the modulations on one-half of the modulated high frequency waves applied to the coupling stage, filtering means conected to the output of the diode to filter out the carrier frequency waves, a clipping diode connected to said filtering means, a second conductive path, a second diode connected in said second conductive path and oppositely poled to detect the modulation on the other half of the modulated high frequency waves, second filtering means to filter out the carrier frequency connected to the second detector diode and a second clipping diode connected to said second filtering means, voltage divider means for attenuating the signal in said conductive path, the output of both of said first and second conductive paths being connected together to combine the detected, filtered and limited signals in opposed phase, and means for commonly conecting the combined resultant signal to the audio frequency amplifying means.

5. A coupling stage for a communication receiver as defined in claim 4 in which the common conducting means for applying the combined resultant signal to the audio frequency amplifying means includes a condenser across which the resultant signal is developed to further suppress any remaining sharp pulses.

6. A coupling stage for a communication receiver as defined in claim 4 in which the common connecting means for applying the combined resultant signal to the audio frequency amplifying means includes a condenser across which the resultant signal is developed to further suppress any remaining sharp pulses, and a transistor amplifier stage connected as an emitter-follower circuit.

7. In a communication receiver for modulated high frequency waves which include wanted intelligence modulation, noise pulses and carrier frequency waves, said receiver having high frequency amplifying means and audio frequency amplifying means; a coupling stage connecting the high frequency amplifying means and the audio frequency amplifying means and including a first conductive path, a diode connected in said first conductive path and so poled as to detect the modulations on one-half of the modulated high frequency waves, filtering means connected to the output of the diode to filter out the carrier frequency waves and a clipping diode connected to said filtering means, a second conductive path, a second diode connected in said second conductive path and oppositely poled to detect the modulation on the other half of the modulated high frequency waves, second filtering means connected to the second diode, a voltage divider connected to the second filtering means, a second clipping diode connected to said voltage divider to provide a portion of said signal to said second clipping diode, means for biasing both clipping diodes to the same level, common means for connecting the output of both clipping diodes together to combine the detected, filtered and limited signals in opposed phase whereby the noise pulses are equal and cancel out but the wanted intelligence modulation signals being unequal due to the voltage division emerge as a desired audio frequency signal to be applied to the audio frequency amplifying means.

8. A coupling stage for a communication receiver as defined in claim 7 in which the common conducting means for applying the combined resultant signal to the audio frequency amplifying means includes a condenser across which the resultant signal is developed to further suppress any remaining sharp pulses.

9. A coupling stage for a communication receiver as defined in claim 7 in which the common connecting means for applying the combined resultant signal to the audio frequency amplifying means includes a condenser across which the resultant signal is developed to further suppress any remaining sharp pulses, and a transistor amplifier stage connected as an emitter-follower circuit.

References Cited

UNITED STATES PATENTS

| | | | |
|---|---|---|---|
| 2,394,544 | 2/1946 | Gottier | 325—475 |
| 2,620,439 | 12/1952 | Dome | 325—480 |
| 2,646,502 | 7/1953 | Bell | 325—480 XR |

KATHLEEN H. CLAFFY, Primary Examiner

B. P. SMITH, Assistant Examiner

U.S. Cl. X.R.

325—475, 477